(12) United States Patent
Taguchi

(10) Patent No.: US 9,689,507 B2
(45) Date of Patent: Jun. 27, 2017

(54) VACUUM VALVE

(71) Applicant: Shimadzu Corporation, Kyoto (JP)

(72) Inventor: Tatsuhiro Taguchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 14/940,343

(22) Filed: Nov. 13, 2015

(65) Prior Publication Data

US 2016/0195191 A1    Jul. 7, 2016

(30) Foreign Application Priority Data

Jan. 7, 2015  (JP) .................. 2015-001442

(51) Int. Cl.
| F16K 3/06 | (2006.01) |
| F16K 51/02 | (2006.01) |
| F16K 3/10 | (2006.01) |
| F16K 3/20 | (2006.01) |

(52) U.S. Cl.
CPC ............. *F16K 51/02* (2013.01); *F16K 3/06* (2013.01); *F16K 3/10* (2013.01); *F16K 3/207* (2013.01)

(58) Field of Classification Search
CPC ..... F16K 3/06; F16K 3/10; F16K 3/12; F16K 3/085; F16K 51/02
USPC .................................. 251/301, 359
See application file for complete search history.

(56) References Cited

U.S. PATENT DOCUMENTS

| 4,060,096 A * | 11/1977 | Schade ................. A62C 2/12 126/287.5 |
| 4,161,307 A * | 7/1979 | Clinch ................. B60H 1/00 251/193 |
| 4,373,546 A * | 2/1983 | Krakovsky ........... F16K 3/06 137/330 |
| 5,873,562 A | 2/1999 | Marugg |
| 6,494,434 B1 * | 12/2002 | Geiser ................. F16K 1/24 251/229 |
| 6,629,682 B2 * | 10/2003 | Duelli ................. F16K 51/02 251/158 |
| 6,994,317 B2 * | 2/2006 | Fischer ................ F16K 3/029 251/193 |
| 7,278,444 B2 * | 10/2007 | Lucas .................. F16K 3/06 137/599.18 |
| 8,733,734 B2 * | 5/2014 | Nakamura ........... F16K 1/2085 251/174 |
| 9,267,605 B2 * | 2/2016 | Abatchev .......... H01L 21/30655 |

FOREIGN PATENT DOCUMENTS

JP    09-210222 A    8/1997

* cited by examiner

*Primary Examiner* — Matthew W Jellett
(74) *Attorney, Agent, or Firm* — Renner, Otto, Boisselle & Sklar, LLP

(57) ABSTRACT

A vacuum valve includes a valve opening and a valve plate that opens and closes the valve opening. A part of an edge of the valve opening is a wedge edge portion having a wedge shape projected outward. The wedge edge portion is provided in a region where the valve plate starts to open the valve opening when the valve plate is moved to open the valve opening.

3 Claims, 16 Drawing Sheets

VACUUM VALVE

BACKGROUND OF THE INVENTION

1. Field of the Invention

The present invention relates to a vacuum valve.

2. Description of the Related Art

When a vacuum pump such as a turbo-molecular pump and the like is attached to a vacuum chamber of a vacuum processing device, a vacuum valve is generally interposed.

There is a vacuum valve including an opening portion and a valve plate. In this vacuum valve, an opening degree of the valve plate may be changed to change an area (an open area) of a region where the opening portion is released without being opposed to the valve plate (an open region), by which a conductance of the vacuum valve may be changed. This technique may be used for pressure control inside a vacuum chamber.

A vacuum valve of which opening portion has a circular cross-sectional shape is general, and an edge portion of the valve plate of this vacuum valve generally has a circular arc shape. Combination of the opening portion and the valve plate having the above-described shapes causes a problem that at a point where the valve plate starts to open, the change in the open area with respect to the opening degree of the valve plate is large.

In Patent Literature 1 (JP-A-9-210222), there has been disclosed a valve plate having an outline resulting from off-setting apart of an edge end portion inward, or projecting the same outward, which has improved flow controllability.

However, in the invention described in Patent Literature 1, in order to provide the relevant outline, a thickness in an outer circumferential direction of another edge end portion needs to be made large, and as a result, a size of the valve plate is disadvantageously increased. The increase in size of the valve plate incurs an increase in weight and brings about a harmful effect on high-speed operation of the valve plate.

SUMMARY OF THE INVENTION

In a preferred embodiment of the present invention, 1 vacuum valve includes a valve opening and a valve plate that opens and closes the valve opening. A part of an edge of the valve opening is a wedge edge portion having a wedge shape projected outward, and the wedge edge portion is provided in a region where the valve plate starts to open the valve opening when the valve plate is moved to open the valve opening.

Preferably a vertex of a wedge of the wedge edge portion is located at a position where an edge of the valve plate first comes into contact with the edge of the valve opening.

Preferably a member formed with the wedge edge portion is provided detachably with respect to the valve opening.

Preferably the wedge edge portion includes a first line segment extending from the vertex, a second line segment extending from the vertex, a first circular arc extending from the first line segment, and a second circular arc extending from the second line segment.

Preferably when the valve plate starts to open the valve opening, a change rate of an opening area is made small, as compared with a valve opening having a circular cross section.

According to the preferred embodiment of the present invention, in a period when the valve plate starts to open the opening, the open area can be changed moderately with respect to the opening degree of the valve plate without changing a shape of the valve plate.

DETAILED DESCRIPTION OF PREFERRED EMBODIMENT

Embodiment

Figure 1:
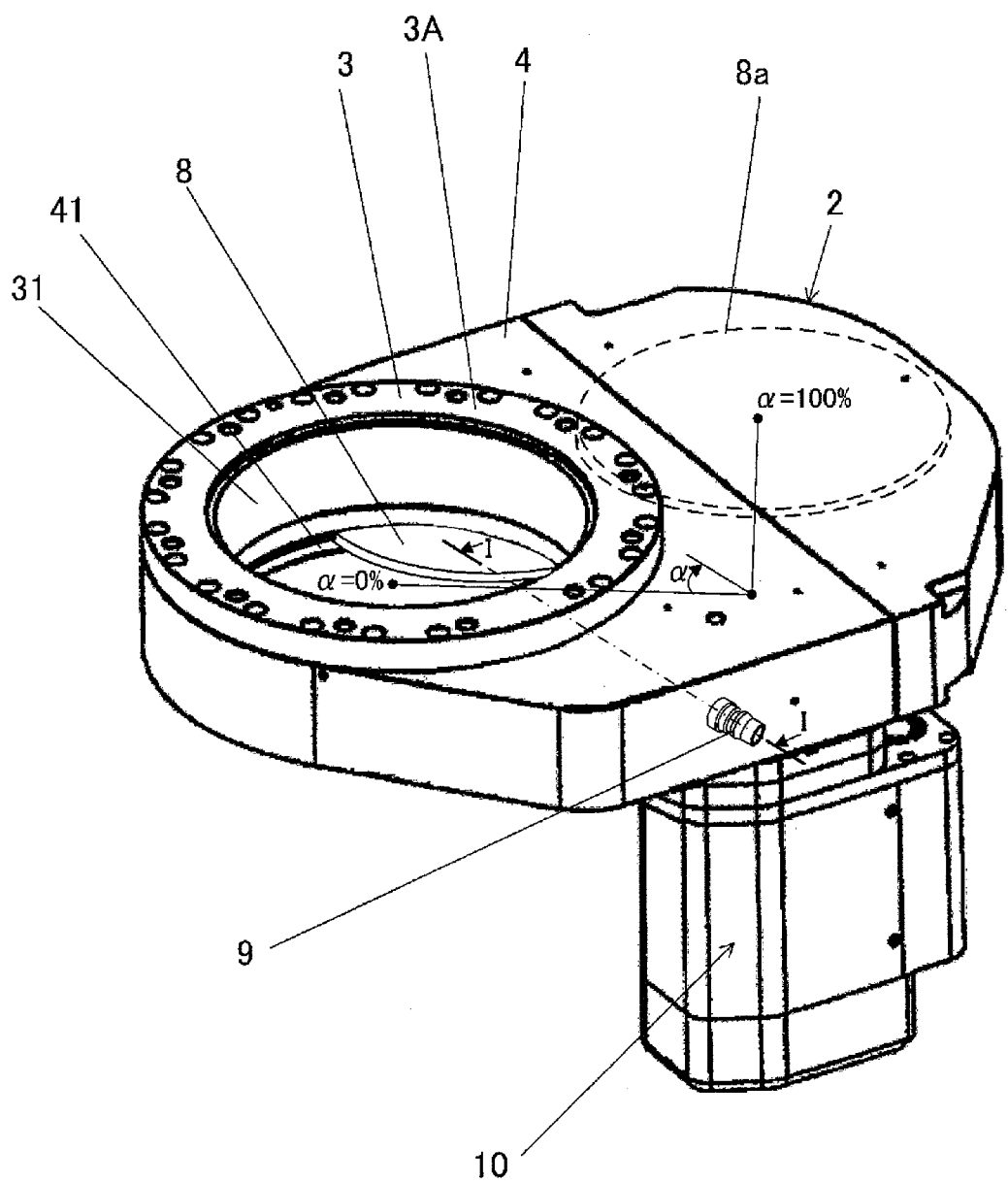
FIG. 1 is a perspective view of a vacuum valve according to one embodiment of the present invention.

FIG. 1 is a perspective view showing an outside appearance of a vacuum valve 1 according to one embodiment of the present invention. The vacuum valve 1 includes a valve body 2 and a driving portion 10. The valve body 2 includes a flange 3, a housing 4 formed with a flange surface 6 (refer to FIG. 2) and a compressed air inlet/outlet 9, and a valve plate 8 slide-driven inside the housing 4. The flange 3 is fixed to a vacuum chamber of a vacuum processing device, and a vacuum pump is fixed to the flange surface 6. Although illustration is omitted, the driving portion 10 is provided with a motor that oscillatingly drives the valve plate 8, and a controller that drives and controls the motor.

Reference character α shown in FIG. 1 denotes an opening degree of the valve plate 8. "α=0%" indicates the opening degree α at which an opening portion 31 of the flange 3 is fully closed, and "α=100%" indicates the opening degree α at which the opening portion 31 of the flange 3 is fully opened. A broken line 8a indicates the valve plate 8 at the time of full opening (α=100%). The valve plate 8 is oscillatingly driven by the motor of the driving portion 10. Adjusting the opening degree of the valve plate 8 allows a flow of a gas flowing from the vacuum processing device to the vacuum pump to be adjusted.

The valve body 2 has opening portions 31, 41. Although not shown in FIG. 1, in the present embodiment, a wedge edge portion D1 having a wedge shape is provided in the opening portion 41. The wedge edge portion D1 will be described in FIG. 3 and later.

Figure 2:
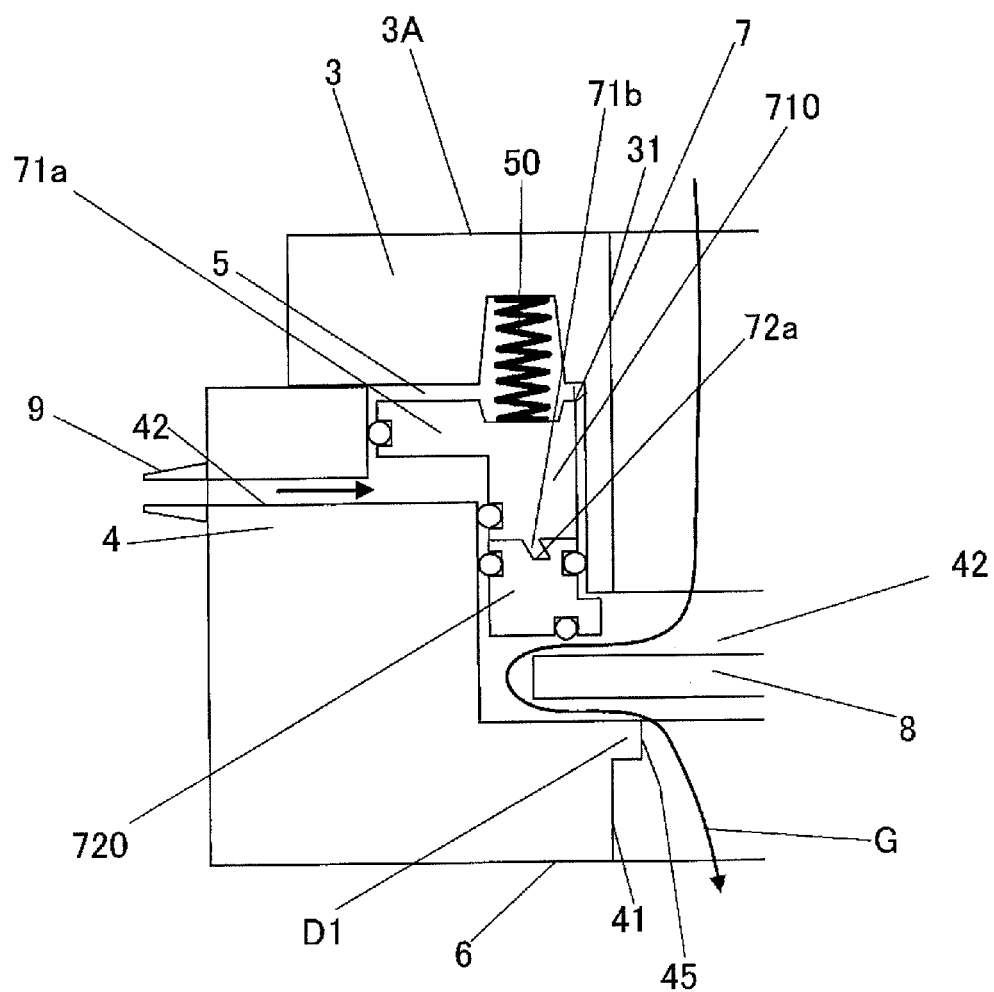
FIG. 2 is a view showing operation of a sealing body.

FIG. 2 is a cross-sectional view along I-I in FIG. 1. However, unlike FIG. 1, in FIG. 2, the valve plate 8 is fully closed ($\alpha$=0%).

The flange 3 has a seal surface 3A and the opening portion 31. The housing 4 has the compressed air inlet/outlet 9, a vent hole 42, the opening portion 41, and the flange surface 6. The flange 3 and the housing 4 are fastened by bolts not shown.

The opening portion 31 and the opening portion 41 are opposed to each other. The valve plate 8 is inserted and removed between the opening portion 31 and the opening portion 41. The vacuum chamber is fastened on a side of the opening portion 31, and the vacuum pump is fastened on a side of the opening portion 41.

A cylindrical containing portion 5 in which a sealing body 7 is contained is formed between the flange 3 and the housing 4. The sealing body 7 is made of a piston portion 710 and a sealing 720. The piston portion 710 and the sealing 720 are engaged with each other by a projected portion 71b and a depressed portion 72a.

The piston portion 710 receives an upward force in the figure by compressed air (pressurized air) sent from a pressurized air introduction passage 42. Moreover, the piston portion 710 receives a downward force in the figure by a compression spring 50. When the compressed air is introduced, the sealing body 7 moves upward in the figure, and when the compressed air is discharged, the sealing body 7 moves downward in the figure.

The valve plate 8 is fully closed ($\alpha$=0%), and further, the sealing body 7 is caused to abut on the valve plate 8, which brings about a valve closing state. As a result, a flow channel G of the gas flowing from the vacuum chamber to the vacuum pump is shut off. On the contrary, separation of the sealing body from the valve plate 8 allows the valve closing state to be released, thereby opening the flow channel G.

As shown in FIG. 2, the wedge edge portion D1 is provided in the opening portion 41. The wedge edge portion D1 is preferably provided in the vicinity of the valve plate 8. Hereinafter, a portion that is a part of the opening portion 41, and has an opening including the wedge edge portion D1 is referred to as a valve opening 45. The wedge edge portion D1 is provided integrally with the opening portion 41.

Figure 3:
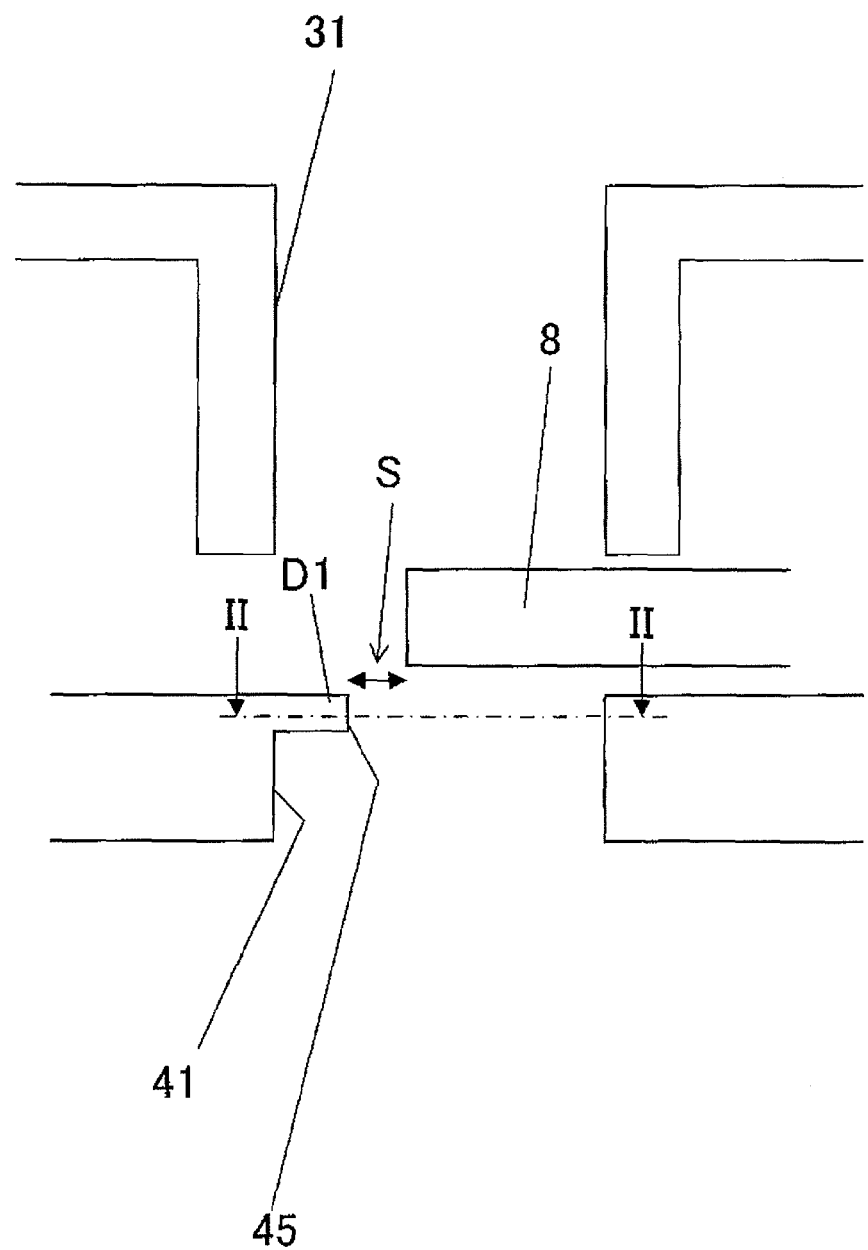
FIG. 3 is a schematic cross-sectional view of a valve body, showing an open region.
Figure 4:
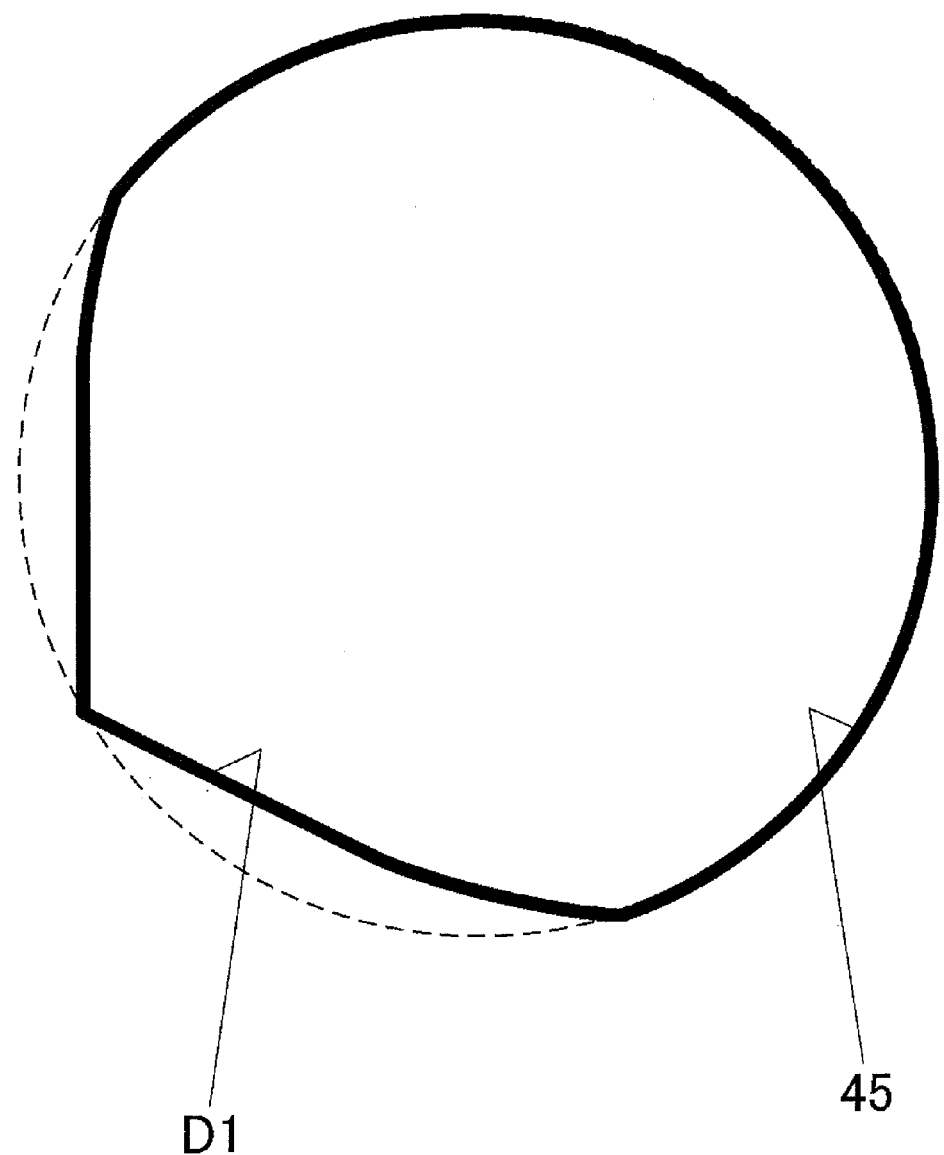
FIG. 4 is a view showing a shape of a valve opening.

FIG. 3 shows a simplified cross section of the valve body 2. FIG. 4 is a cross-sectional view along II-II in FIG. 3. In FIG. 4, the valve opening 45 is indicated by thick line. A conventional circular opening portion is indicated by broken line. The wedge edge portion D1 is an edge portion of the valve opening 45, and indicates an edge portion having a shape deviated from the conventional circular edge portion. That is, the edge portion deviated from broken line in FIG. 4 is the wedge edge portion.

In the present embodiment, the wedge edge portion D1 is provided in the vicinity of the valve plate 8 on an inner circumference side of the opening portion 41, which forms the valve opening 45. A region of the valve opening 45 opened without being opposed to the valve plate is referred to as an open region S (refer to FIG. 3). Moreover, an area of the open region S is referred to as an open area.

Figure 5:
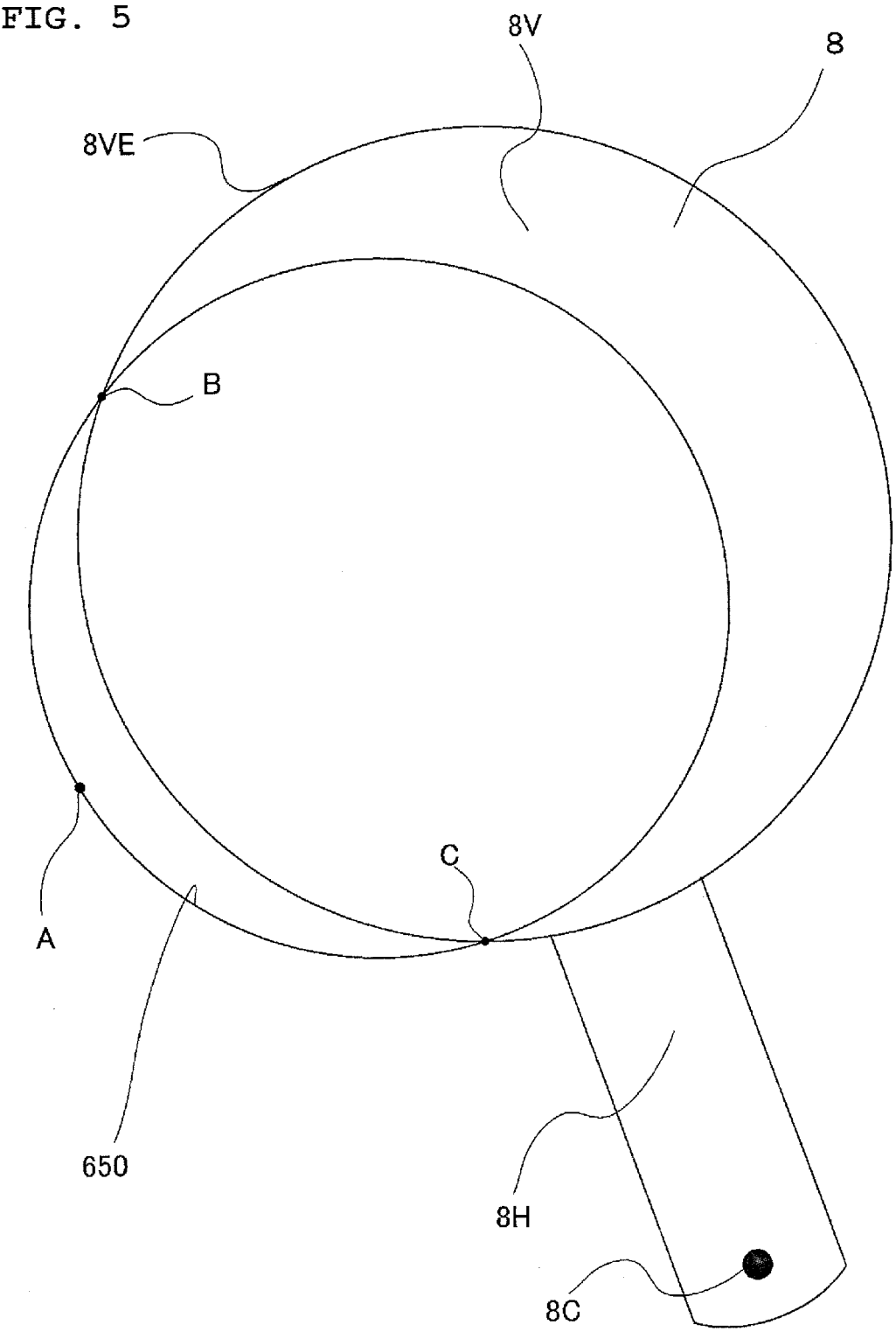
FIG. 5 is a view showing a method for setting a shape of a wedge edge portion of the valve opening (No. 1)

FIGS. 5 to 9 are views for describing a method for setting the wedge edge portion D1 shown in FIG. 4. FIG. 5 shows the valve plate 8 and an opening portion 650. The opening portion 650 is an opening portion when the opening portion 41 is not provided with the wedge edge portion D1, and is a circular opening.

The valve plate 8 has a valve portion 8V and a beam portion 8H. The valve plate 8 is inserted and removed between the opening portion 31 and the opening portion 41 by oscillating around a rotation axis 8C located in the beam portion 8H.

A point A shown on the opening portion 650 indicates a position where the valve plate 8 first opens the opening portion 650 when the valve plate 8 opens the opening portion 650. That is, when the valve plate 8 moves in an opening direction at the time of full closing, an edge 8VE of the valve portion 8V of the valve plate 8 can be first seen at the position of the point A.

In FIG. 5, the valve plate 8 is located at a position of a predetermined opening degree. The predetermined opening degree is decided by conditions of "the opening portion 650 and the edge 8VE cross at two points" and "the opening portion 650 starts to open", other design principles and the like.

Points B, C shown in FIG. 5 indicate intersection points where the edge 8VE of the valve portion 8V of the valve plate 8 and the opening portion 650 cross each other by locating the valve plate 8 at the relevant position. In FIGS. 6 to 9 as well, the valve plate 8 is located at the position shown in FIG. 5.

Figure 6:
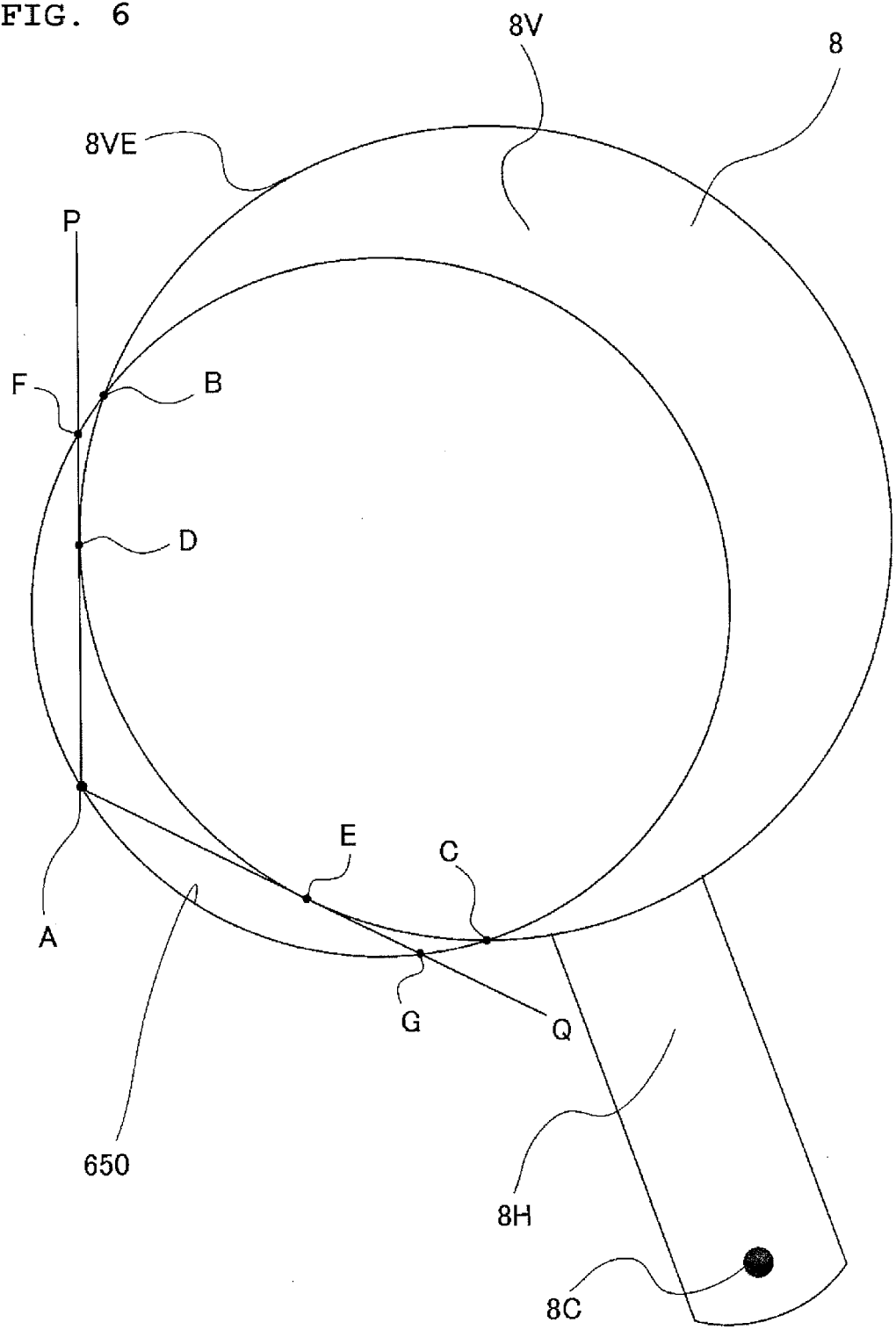
FIG. 6 is a view showing the method for setting the shape of the wedge edge portion of the valve opening (No. 2)

FIG. 6 shows a state where tangents are drawn from the point A with respect to the edge 8VE of the valve portion 8V of the valve plate 8 shown in FIG. 5. A tangent point of the tangent AP with the edge 8VE is a point D, and a tangent point of the tangent AQ with the edge 8VE is a point E. An intersection point of the tangent AP with the opening portion 650, which is different from the point A, is a point F. An intersection point of the tangent AQ with the opening portion 650, which is different from the point A, is a point G.

Figure 7:
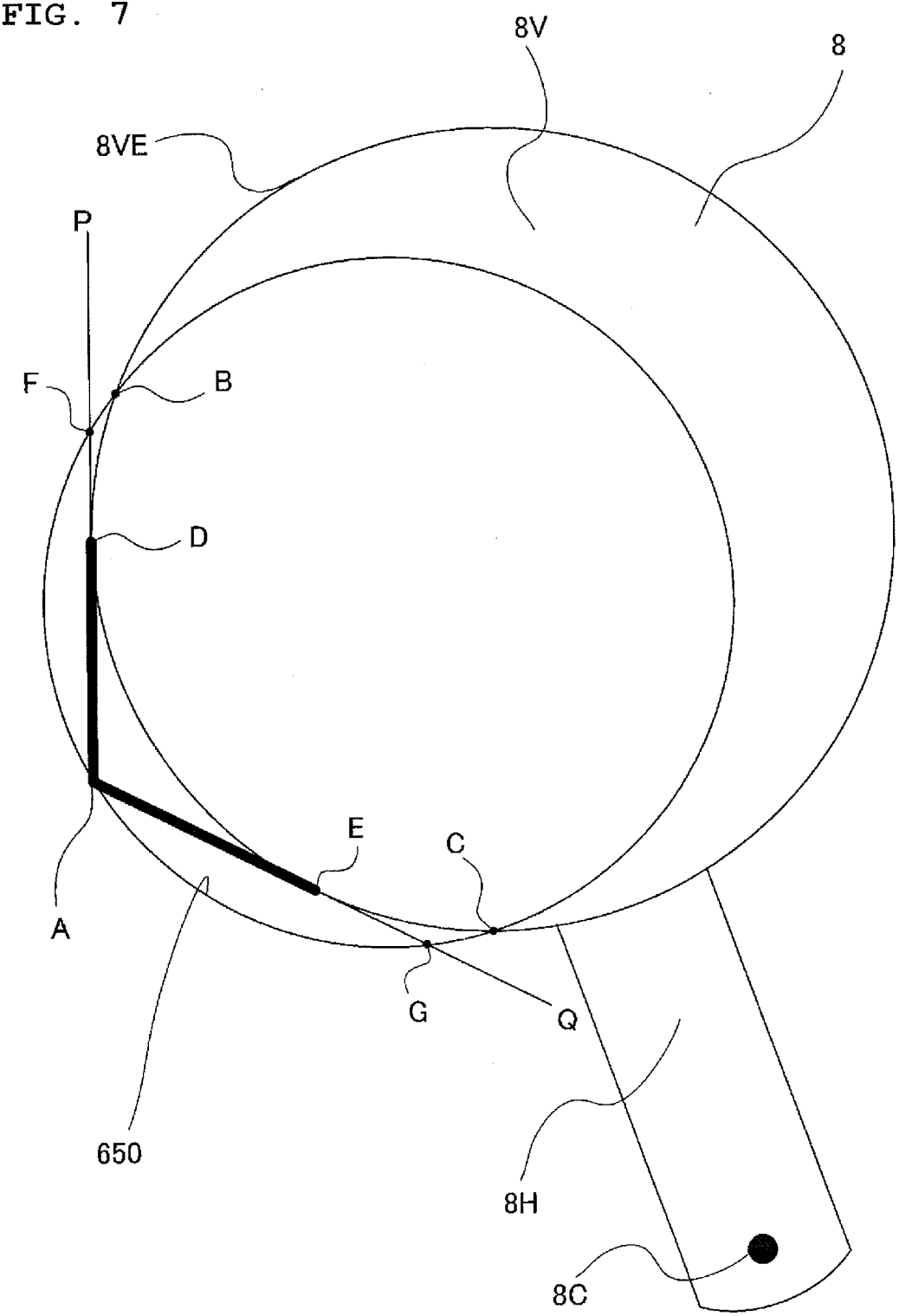
FIG. 7 is a view showing the method for setting the shape of the wedge edge portion of the valve opening (No. 3)
Figure 8:
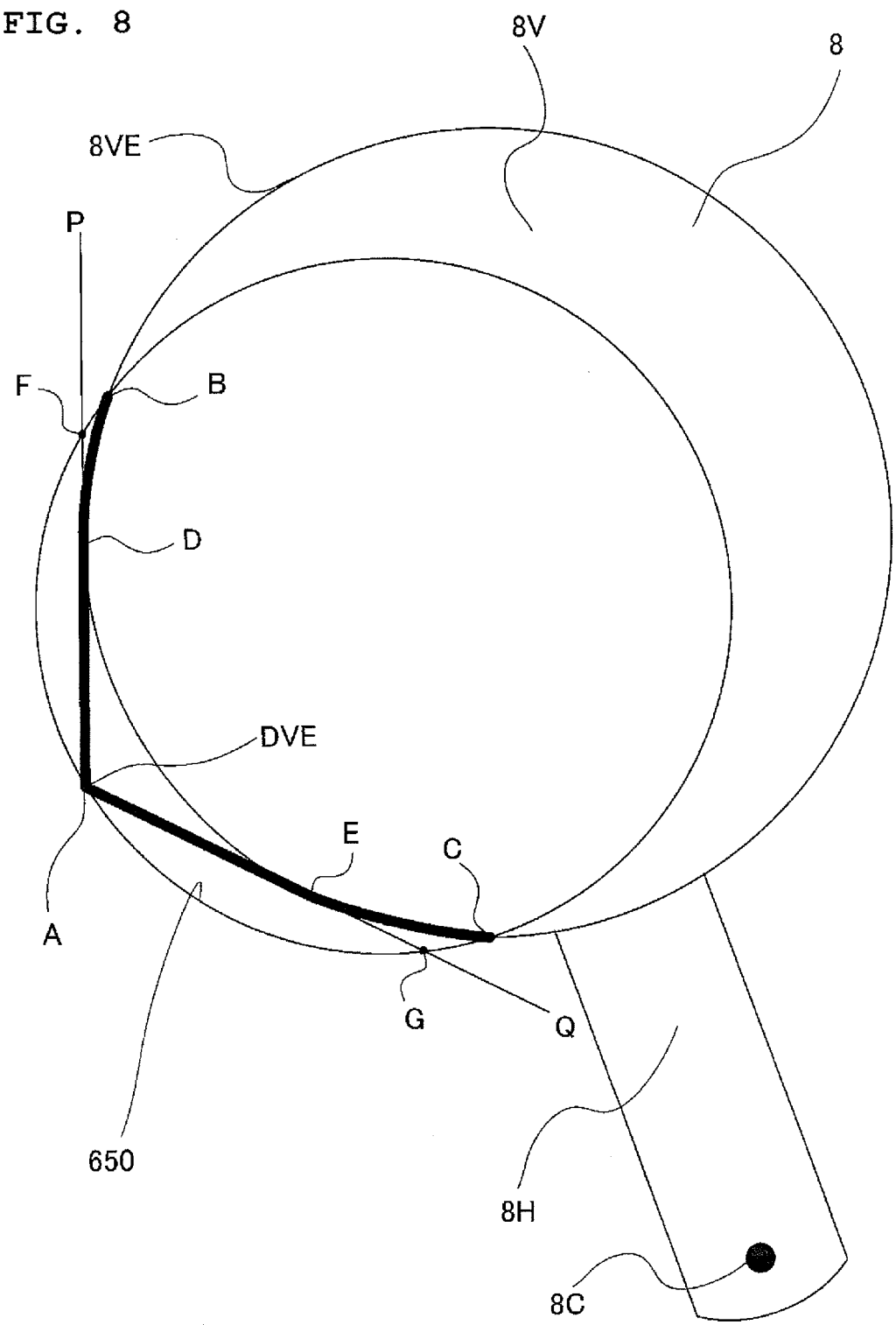
FIG. 8 is a view showing the method for setting the shape of the wedge edge portion of the valve opening (No. 4)
Figure 9:
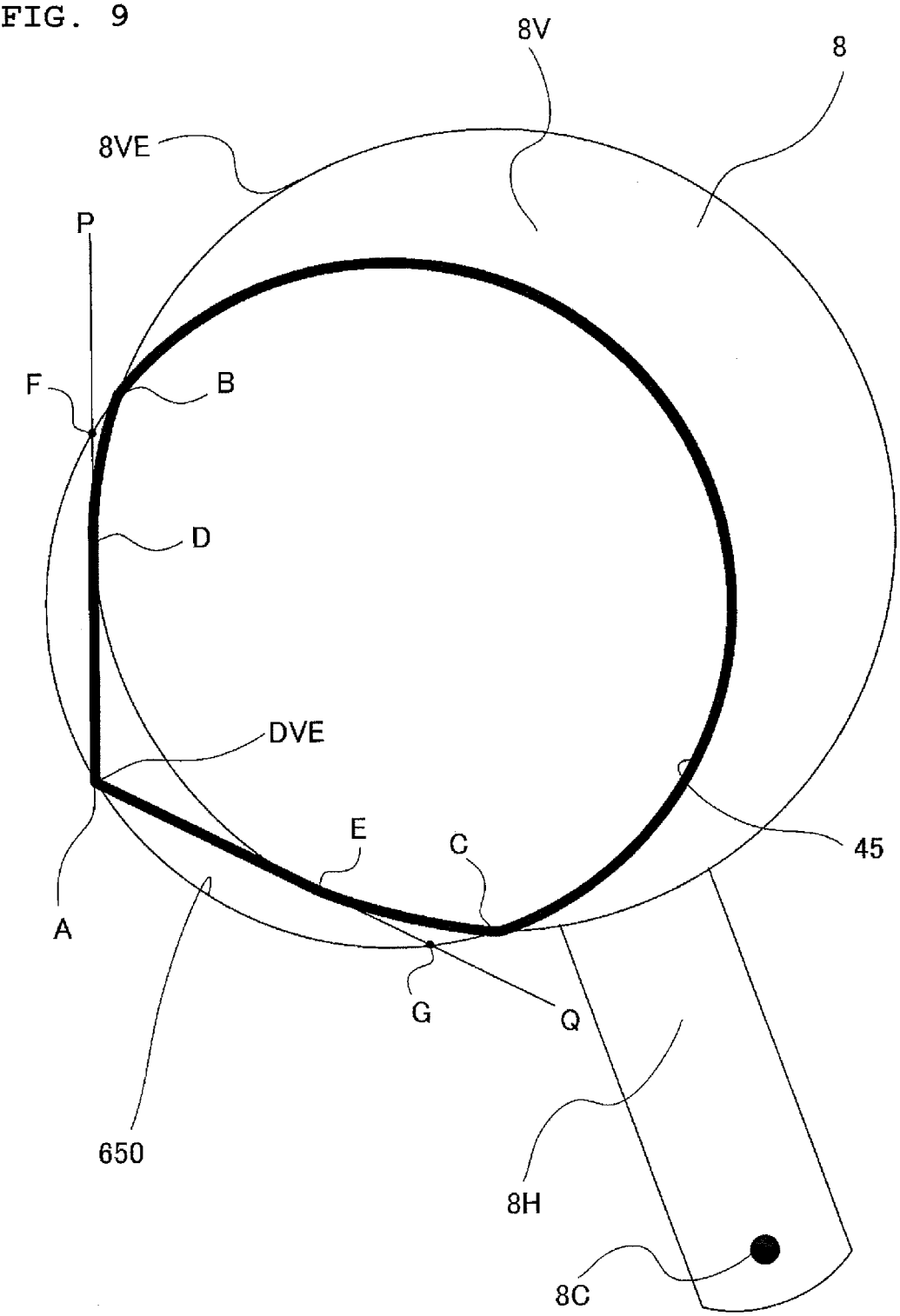
FIG. 9 is a view showing the method for setting the shape of the wedge edge portion of the valve opening (No. 5)

FIGS. 7 to 9 are views for describing a constitution of the wedge edge portion D1 and a constitution of the valve opening 45. The wedge edge portion D1 has, as an outline, a line segment AD and a line segment AE indicated by thick line in FIG. 7. Further, the wedge edge portion D1 has a circular arc DB and a circular arc EC as the outline, as shown in FIG. 8. The circular arc DB and the circular arc EC are attributed to the edge 8VE of the valve portion 8V of the valve plate 8. As described above, the wedge edge portion D1 has the line segment AD, the line segment AE, the circular arc DB, and the circular arc EC as the outline. This allows the wedge edge portion D1 to have a wedge shape projected outward. As described above, the point A is at the position where the valve plate 8 first opens when the valve plate 8 moves in the direction opening the valve opening 45. A vertex DVE of the wedge of the wedge edge portion D1 of the present embodiment is located at the point A. Thus, when the valve plate 8 moves and the open region S is first produced, the open region S is formed by the wedge edge portion D1 and the edge 8VE of the valve portion 8V of the valve plate 8 (refer to FIG. 12 and the like).

In the present embodiment, the wedge edge portion D1 has the circular arc DB and the circular arc EC as the outline. This allows the open region S to be kept one. However, another way to provide the wedge edge portion D1 may be employed. For example, in place of the circular arc DB, a line segment DF and a circular arc FB may be employed, and in place of the circular arc EC, a line segment EG and a circular arc GC may be employed. As understood in FIG. 8, this produces an open region with a vertex of the points D, F, B, and an open region with a vertex of the points E, G, C in addition to the open region S with the vertex of the points A, D, E.

A region indicated by thick line in FIG. 9 indicates the valve opening 45. As described above, the wedge edge portion D1 has the segment AD, the segment AE, the circular arc DB, and the circular arc EC as an outline. The open region S has a circular arc BC attributed to the opening portion 650 indicated by thick line in FIG. 9 as an outline in addition to the above-described wedge edge portion D1 to form a region closed by thick line in FIG. 9. As described above, the valve opening 45 is set.

Here, an opening angle of the valve plate 8 will be described. In the present embodiment, the vertex DVE of the wedge edge portion D1 matches the point A on the edge of the opening portion 650 (refer to FIG. 8 and the like). However, the vertex DVE of the wedge edge portion D1 in the valve opening 45 need not necessarily match the point A. For example, the vertex DVE of the wedge edge portion D1 can be provided inside the edge of the opening portion 650 (refer to FIG. 16A). On the contrary, the vertex DVE of the wedge edge portion D1 can also be provided outside the edge of the opening portion 650 (refer to FIG. 16B). In this manner, depending on a position of the vertex DVE, the opening degree at which the valve opening 45 starts to be opened is changed.

Consequently, a new parameter of an "opening angle" is introduced, and when the opening angle is zero degrees, the valve opening 45 starts to be opened. That is, a reference angular position (a position at the zero degrees) of the opening angle of the valve plate 8 is an angular position of the valve plate 8 when the valve opening 45 is first opened. The opening angle of the valve plate 8 indicates an angle from the reference angular position. The angle in a direction where the valve plate 8 opens is a positive angle of the opening angle of the valve plate 8.

Figure 10:
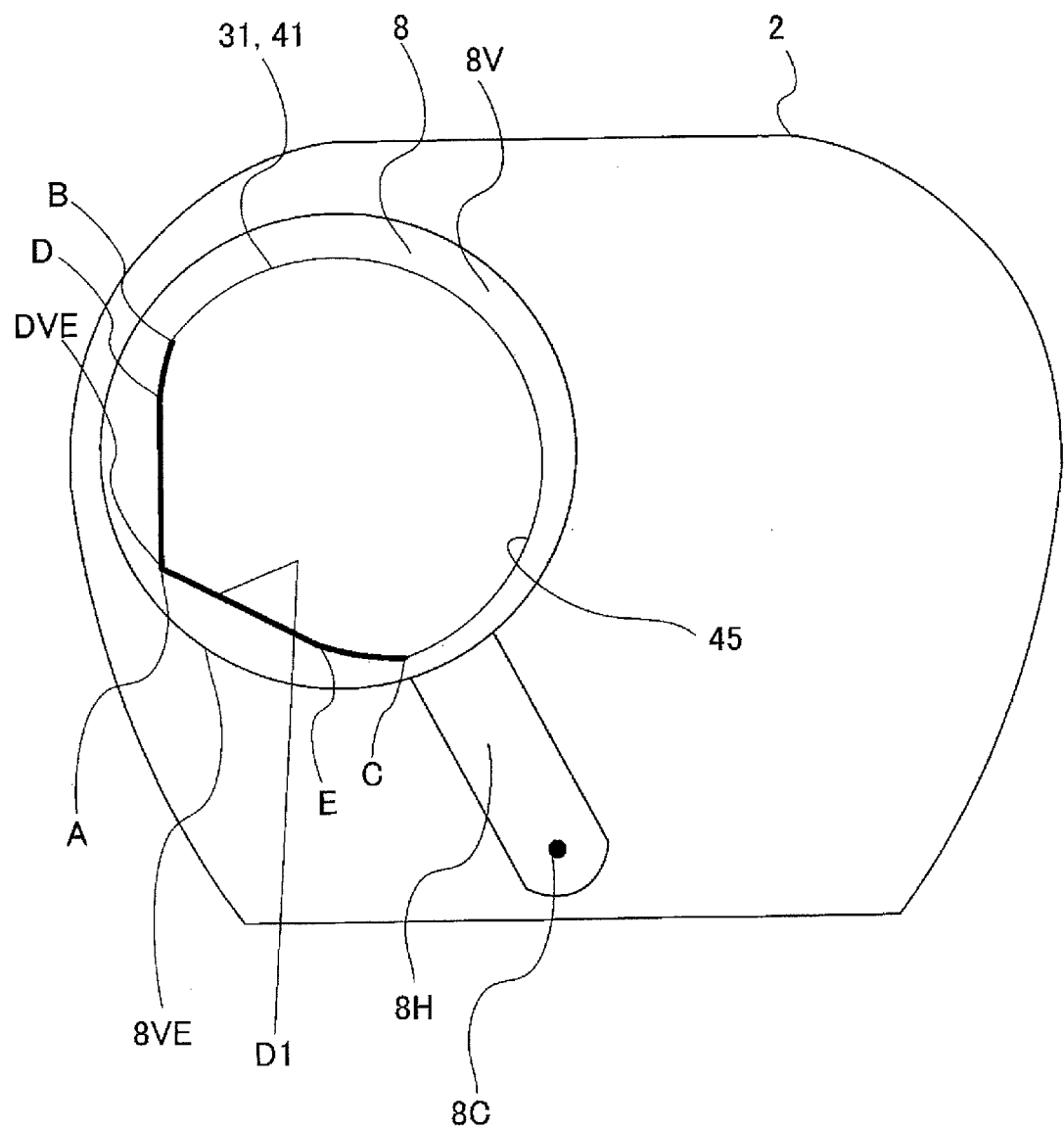
FIG. 10 is a view showing a positional relation between the valve opening and the valve plate at the time of full closing.

FIGS. 10 to 13 are views showing change in the open region S with respect to the opening angle of the valve plate 8. FIG. 10 is a view showing a state when the valve plate 8 is at the position of full closing ($\alpha=0\%$). As shown in FIG. 10, a part of the edge of the valve opening 45 is the wedge edge portion D1 having the wedge shape projected outward (the region indicated by thick line in the figure). As shown in FIG. 10, at the time of full closing ($\alpha=0\%$), the area of the open region S (the open area) is zero. Points A to E shown in FIG. 10 correspond to the points A to E shown in FIGS. 5 to 9, which are similar in FIG. 11 and later.

Figure 11:
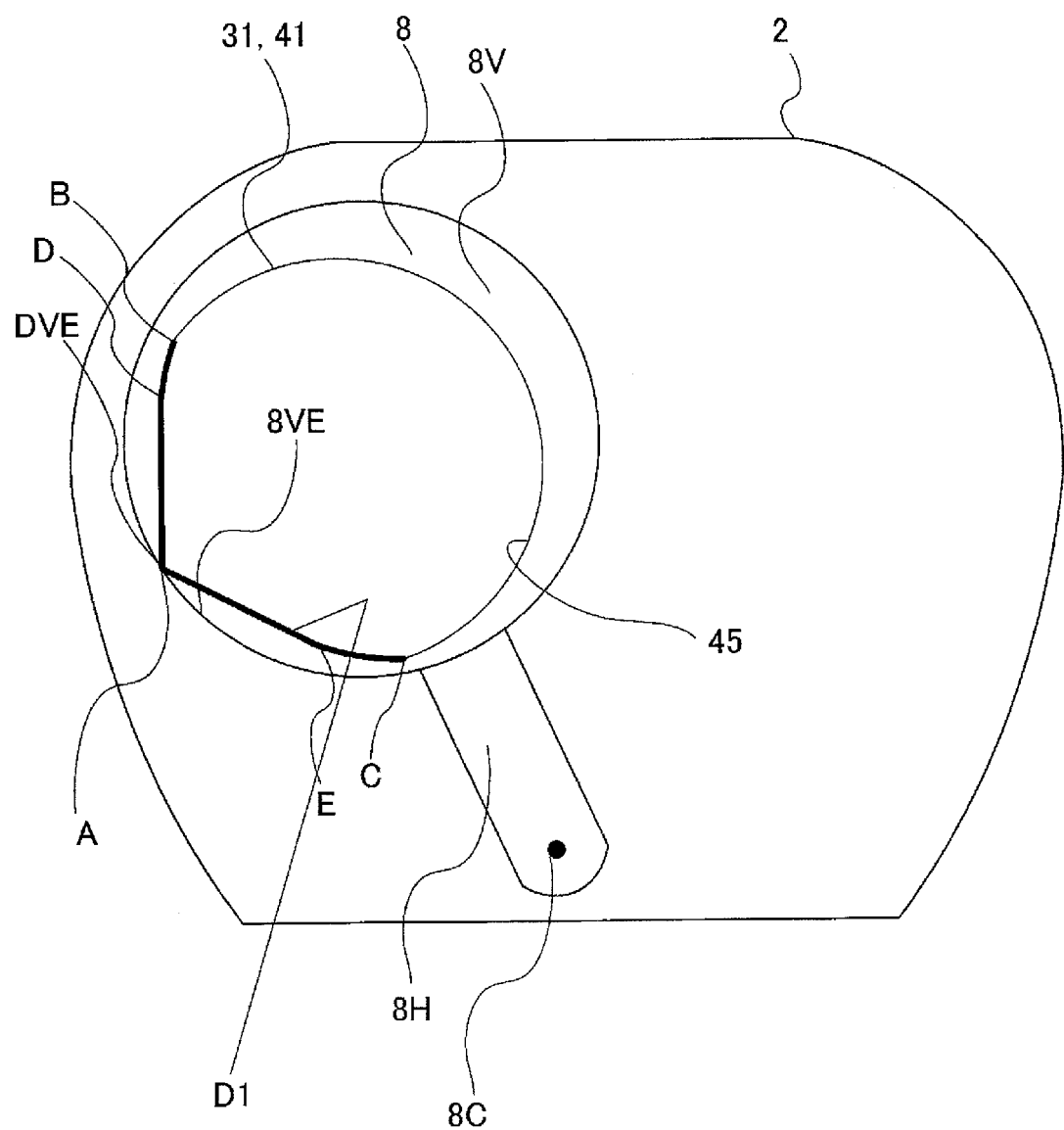
FIG. 11 is a view showing a positional relation between the valve opening and the valve plate when the valve opening starts to be opened.

FIG. 11 is a view showing a state when the valve opening 45 starts to be opened. That is, the reference angular position where the opening angle of the valve plate 8 becomes zero degrees in the present embodiment is shown. As described above, the part of the edge of the valve opening 45 is the wedge edge part D1 (the region indicated by thick line in the figure) having the wedge shape projected outward. The wedge edge portion D1 is provided in a region where the edge 8VE of the valve 8V of the valve plate 8 starts to be seen when the valve plate 8 moves in the direction opening the valve opening 45. In other words, the wedge edge portion D1 is provided in a region where the valve plate 8 starts to open the valve opening 45 when the valve plate 8 is moved to open the valve open 45. Furthermore, the vertex DVE of the wedge edge portion D1 is provided at a position where the edge 8VE is first seen in a region where the edge 8VE starts to be seen when the valve plate 8 moves in the direction opening the valve opening 45. In other words, the vertex DVE of the wedge of the wedge edge portion D1 is located at a position where the edge 8VE of the valve plate 8 first comes into contact with the edge of the valve opening 45. In FIG. 11 as well, the open area is still zero.

Figure 12:
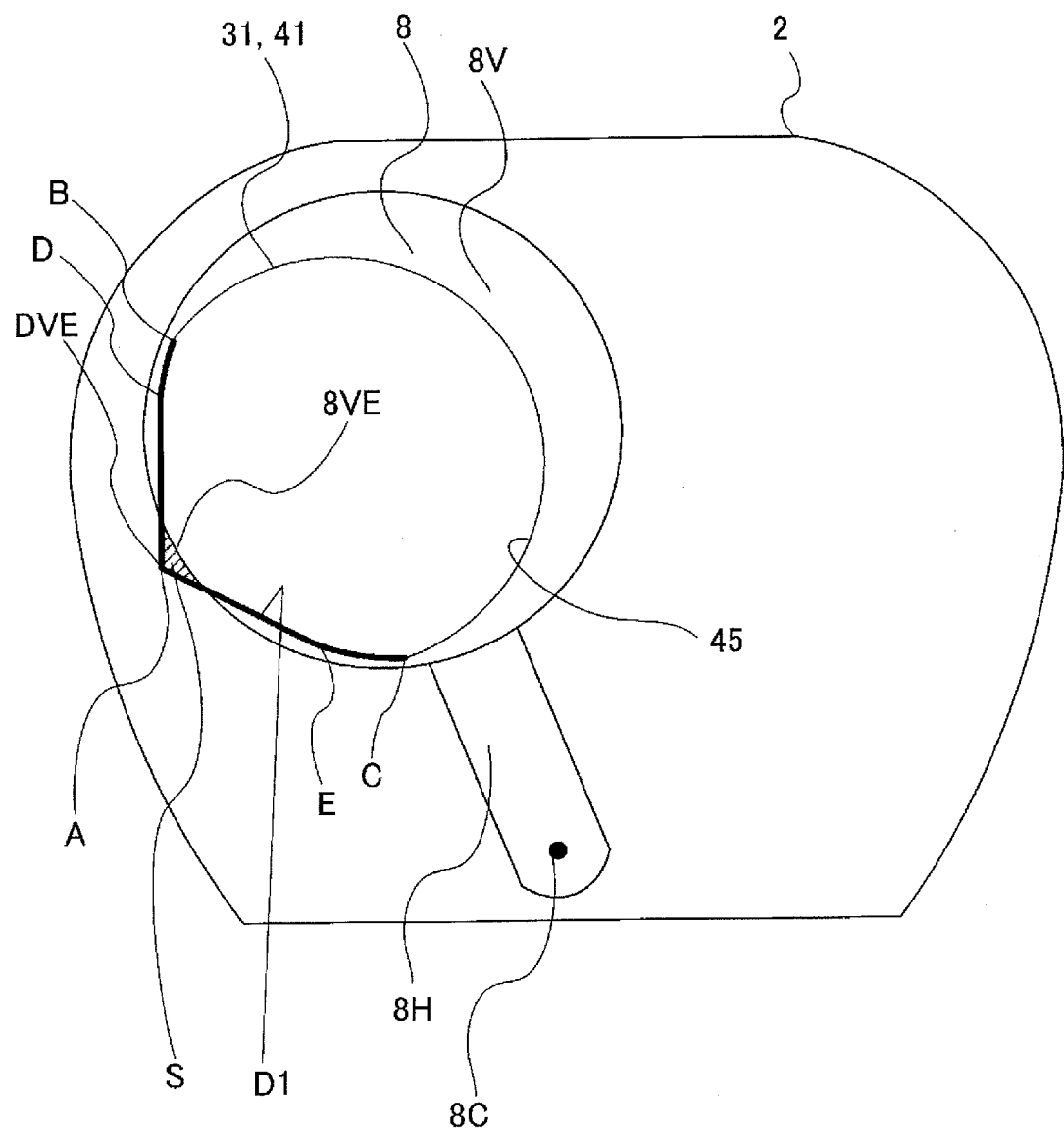
FIG. 12 is a view showing a positional relation between the valve opening and the valve plate when the wedge edge portion and an edge portion of the valve plate cross each other.

FIG. 12 is a view showing a state when the edge 8VE of the valve portion 8V of the valve plate 8 passes the line segment AD and the line segment AE of the wedge edge portion D1. In the present embodiment, the opening angle in FIG. 12 is three degrees. That is, the valve plate 8 shown in FIG. 12 moves by three degrees from the reference angular position in FIG. 11. In FIG. 12, the open region S (the hatching region) is produced.

Figure 13:
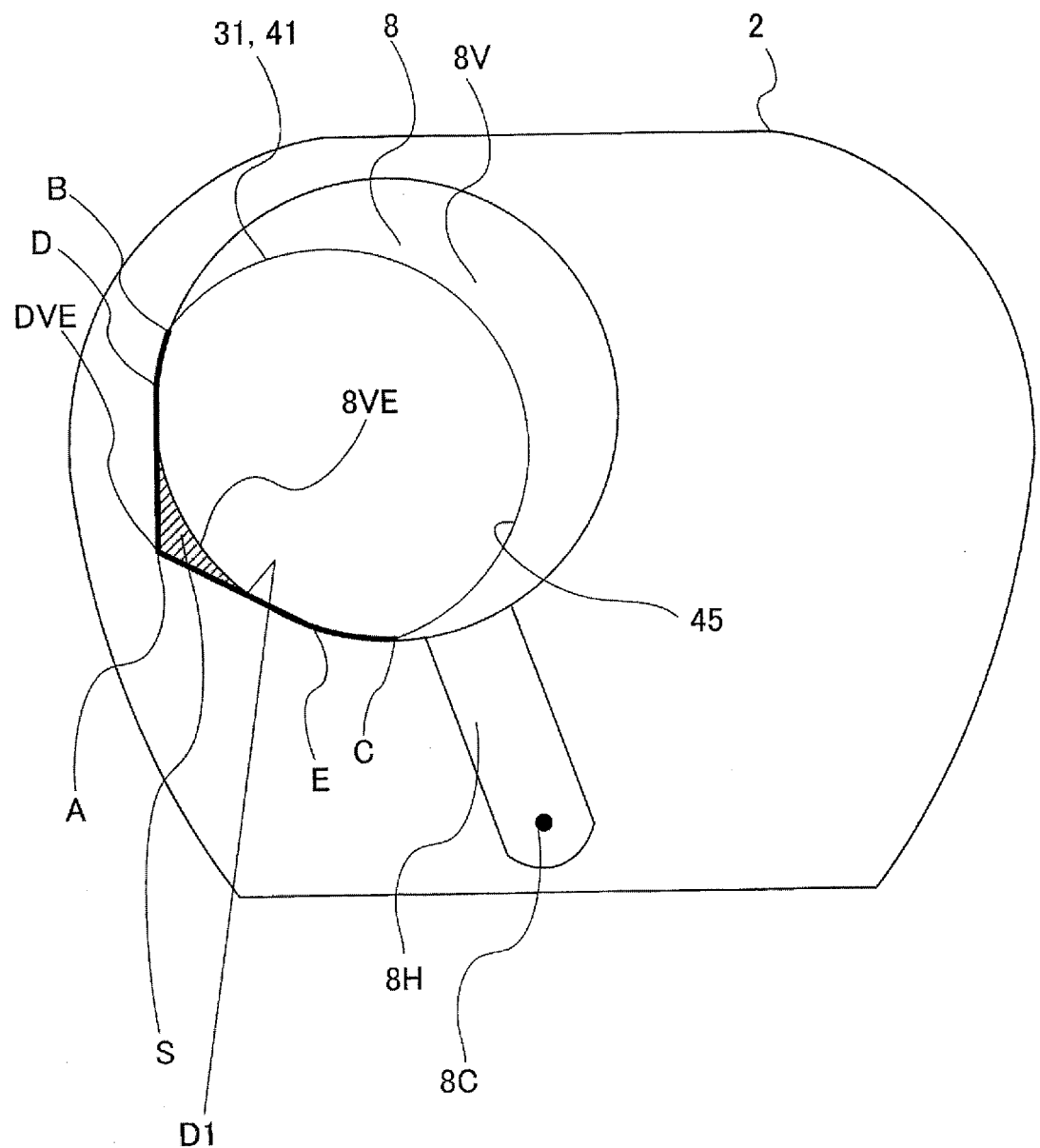
FIG. 13 is a view showing a positional relation between the valve opening and the valve plate when the edge portion of the valve plate makes contact with the wedge edge portion.

FIG. 13 is a view showing a state when the edge 8VE of the valve portion 8V of the valve plate 8 makes contact with the circular arc DB and the circular arc EC of the wedge edge portion D1. In the present embodiment, the opening angle in FIG. 13 is five degrees. As the opening angle of the valve plate 8 is increasing, the open area is increasing. The open area in FIG. 13 is larger than the open area in FIG. 12.

Figure 14:
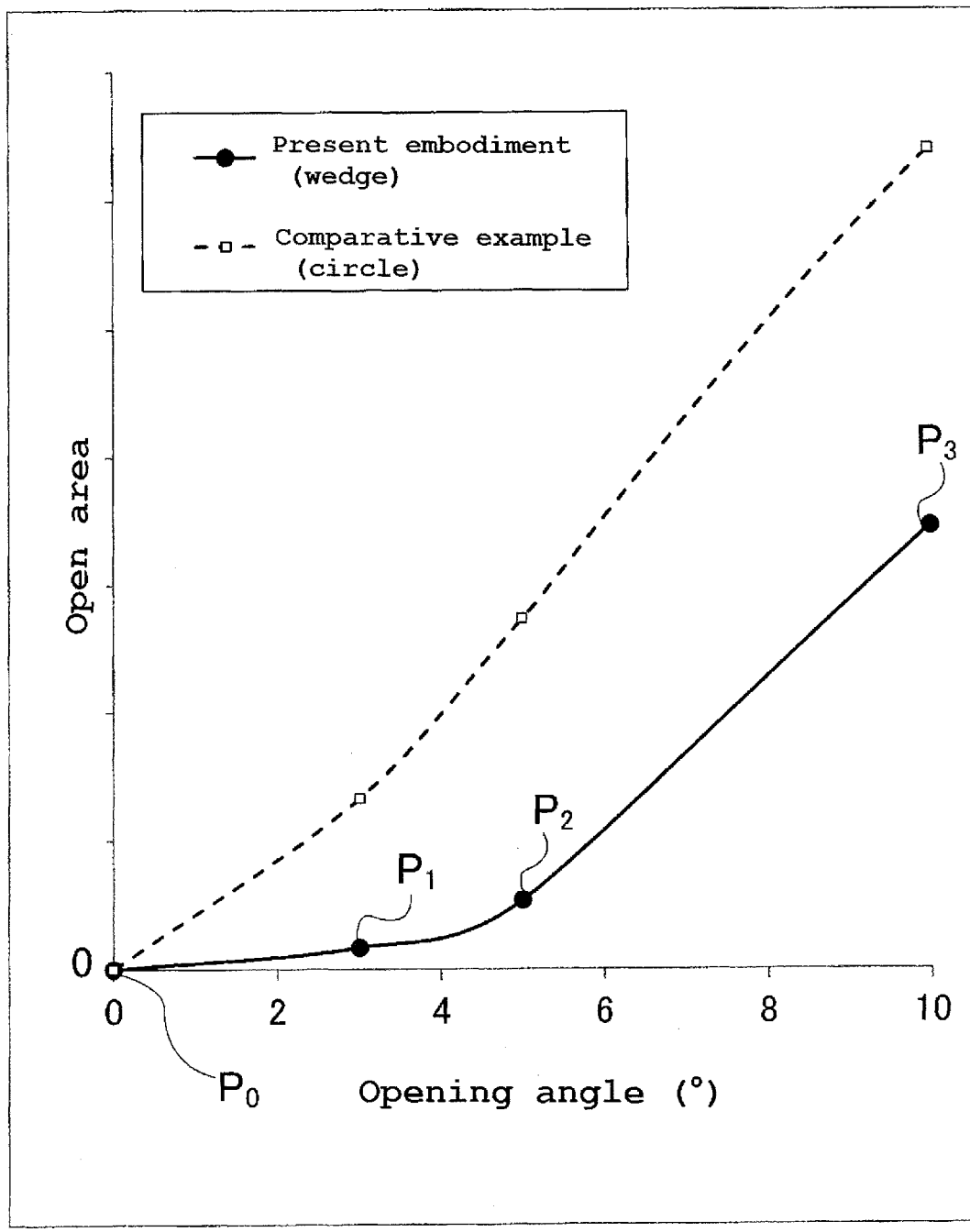
FIG. 14 is a view in which effects are compared between the vacuum valve of the present embodiment and a vacuum valve of a comparative example.
Figure 15A:
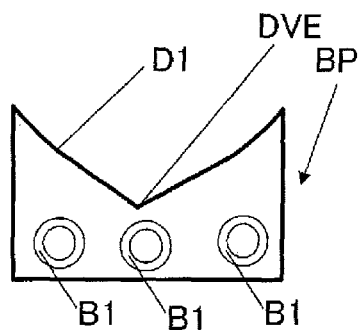
FIGS. 15A to 15D are views showing a Modification in which a wedge edge portion is detachable.
Figure 15B:
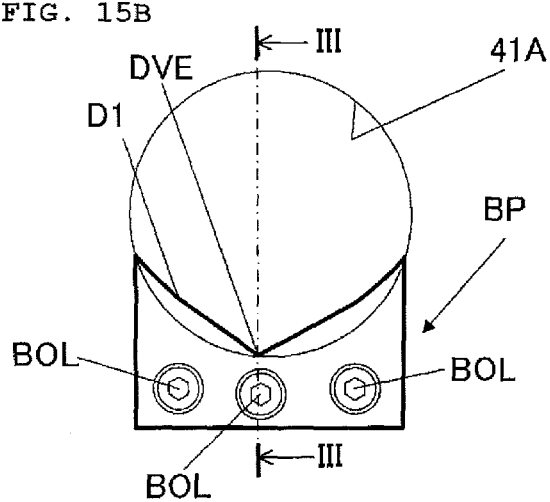
Figure 15C:
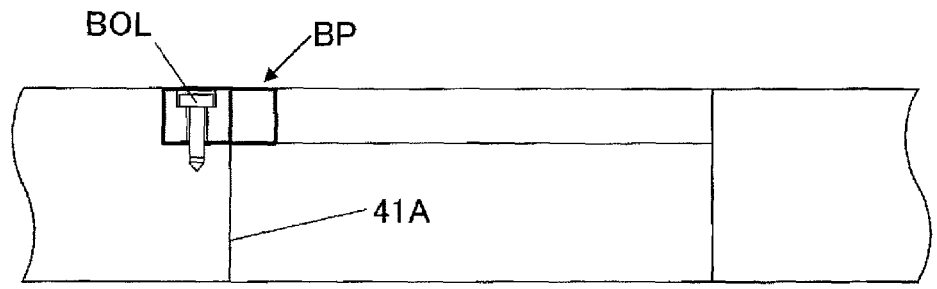
Figure 15D:
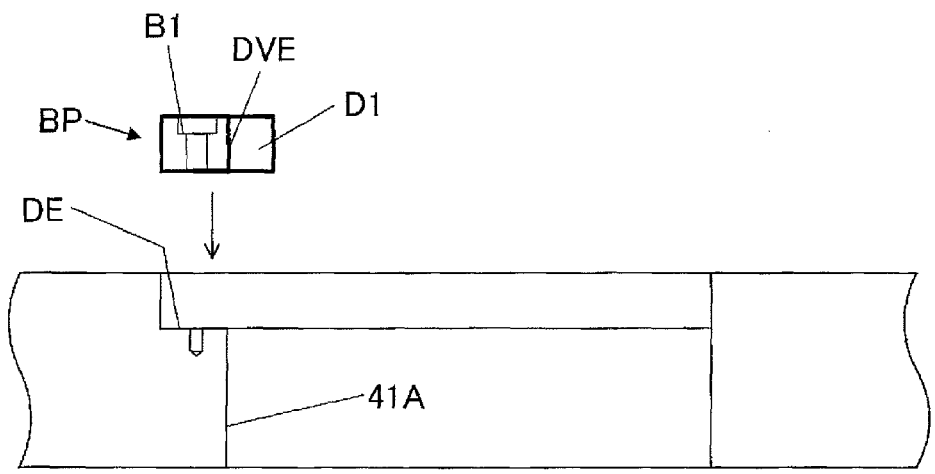

In FIG. 14, the change in the open area with respect to the opening angle in the vacuum valve 1 of the present embodiment, and change in the open area with respect to the opening angle in a vacuum valve of a comparative example are compared. The vacuum valve of the comparative example is different from that of the present embodiment in that a cross section thereof is circular. In FIG. 14, $P_0$ at the opening angle 0° indicates that the valve plate 8 is at the position shown in FIG. 11. $P_1$ at the opening angle 3° indicates that the valve plate 8 is at the position shown in FIG. 12. P2 at the opening angle 5° indicates that the valve plate 8 is at the position shown in FIG. 13. As shown in FIG. 14, it can be understood that since the wedge edge portion D1 is provided in the vacuum valve 1 of the present embodiment, an increase in the open area is more moderate than an increase in the open area of the vacuum valve of the comparative example having a circular edge portion. Moreover, it can be also understood that in the vacuum valve 1 of the present embodiment, when the opening angle is larger than P2 (refer to $P_3$), the change in the open area becomes large.

The vacuum valve of the present embodiment has the following constitution, and has the following effects. (1) In the vacuum valve 1, a part of the edge of the valve opening 45 is the wedge edge portion D1 having the wedge shape projected outward. The wedge edge portion D1 is provided in the region where the valve plate 8 starts to open the valve opening 45 when the valve plate 8 is moved to open the valve opening 45. This enables the open area to be moderately changed with respect to the opening angle of the valve plate 8 in a period when the valve plate starts to open the opening without changing a shape of the valve plate 8. Moreover, since the wedge edge portion D1 is not provided in the valve plate 8, an increase in weight of the valve plate 8 is not brought about. Thus, operation speed of the valve plate 8 does not deteriorate.

(2) The vertex DVE of the wedge edge portion D1 is provided at the position where the edge 8VE is first seen in the region where the edge 8VE starts to be seen when the valve plate 8 moves in the direction opening the valve opening 45. In other words, the vertex DVE of the wedge of the wedge edge portion D1 is located at the position where the edge 8VE of the valve plate 8 first comes into contact with the edge of the valve opening 45. This can change the open area with respect to the opening angle of the valve plate 8 more moderately.

First Modification

FIG. 15 is a view for describing a first Modification. In the first Modification, a member formed with the wedge edge portion D1, which is a separate body from an opening portion 41A, is attached to the opening portion 41A, by which the valve opening 45 is formed. FIG. 15A shows a member BP formed with the wedge edge portion D1. In this member BP, not only the wedge edge portion D1 but bolt holes B1 for performing bolt-fastening are provided. This member BP is attached to the opening portion 41A, as shown in FIG. 15B. FIG. 15C is a cross-sectional view along III-III in FIG. 15B. As shown in FIGS. 15B and 15C, in the present Modification, the member BP is fastened and attached by bolts BOL. The vertex DVE of the wedge edge portion D1 is located at the position where the edge 8VE of the valve plate 8 first comes into contact with an edge of the opening portion 41A, which enables the valve opening 45 similar to that of the above-described embodiment to be obtained. FIG. 15D shows how the member BP is attached to the opening portion 41A. A depressed portion DE is formed in an end portion of the opening portion 41A on a side of the valve plate 8. A screw hole is provided in a bottom surface of the depressed portion DE. The member BP is attached to this depressed portion DE and the bolts BOL are fastened, by which the valve opening having the wedge edge portion D1 can be provided. Moreover, in the member BP, various shapes of the wedge edge portion D1 can be formed. Thus, the use of the detachable type as in the present Modification allows the shape of the wedge edge portion D1 to be easily changed, so that the adjustment of the change in the open area with respect to the opening angle of the valve plate 8 can be easily performed.

Second to fifth Modifications described below are modifications of the wedge shapes of the wedge edge portion. For convenience of description, reference numerals of wedge edge portions of the second to fifth Modifications are D2 to D5, respectively. For description, the circular opening portion 650 is shown as well.

Second Modification

Figure 16A:
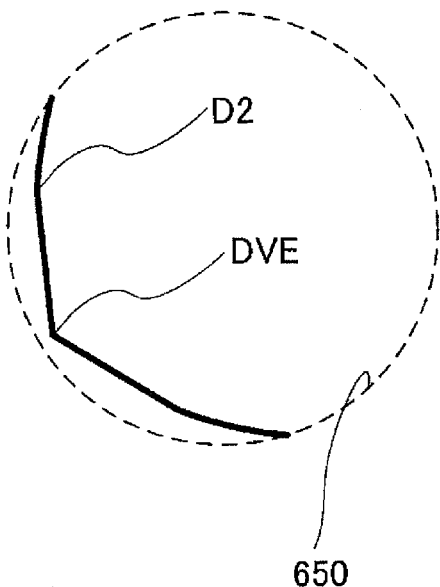
FIGS. 16A to 16D are views showing modifications of a wedge shape of the wedge edge portion.

FIG. 16A is a view showing a second modification. While the vertex DVE of the wedge edge portion D1 of the above-described embodiment is located at the edge of the opening portion 650, a vertex DVE of a wedge edge portion D2 in the second modification is located inside the opening portion 650. Even in this modification, the change in the open area with respect to the opening angle of the valve plate 8 can be made moderate. However, an opening degree at which a valve opening with an edge partially formed by the wedge edge portion D2 of the second modification is opened is larger than the opening degree at which the valve opening 45 with the edge partially formed by the wedge edge portion D1 of the above-described embodiment is opened.

Third Modification

Figure 16B:
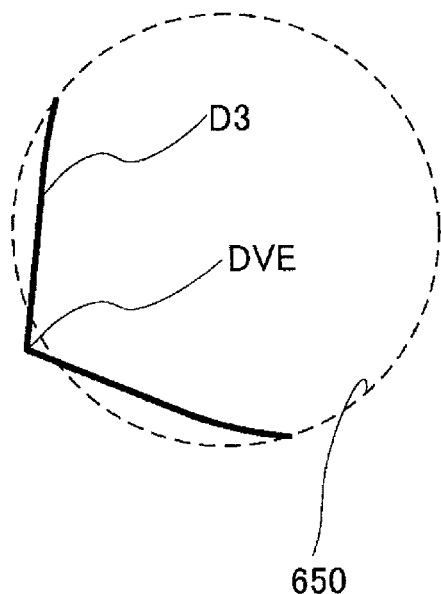

FIG. 16B is a view showing a third modification. While the vertex DVE of the wedge edge portion D1 of the above-described embodiment is located at the edge of the opening portion 650, a vertex DVE of a wedge edge portion D3 of the third modification is located outside the opening portion 650. Even in this modification, the change in the open area with respect to the opening angle of the valve plate 8 can be made moderate. However, an opening degree at which a valve opening with an edge partially formed by the wedge edge portion D3 of the third modification is opened is smaller than the opening degree at which the valve opening 45 with the edge partially formed by the wedge edge portion D1 of the above-described embodiment is opened.

Fourth Modification

Figure 16C:
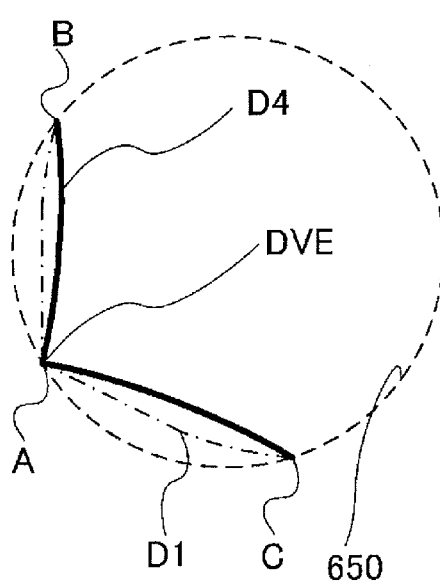

FIG. 16C is a view showing a fourth modification. For comparison, the wedge edge portion D1 of the above-described embodiment is indicated by dashed line. Moreover, for description, the same points A, B, C as those in FIG. 5 are shown.

A vertex DVE of a wedge edge portion D4 of the fourth modification is located at the same position (the point A) as the position of the vertex DVE of the wedge edge portion D1 of the above-described embodiment. A difference between the above-described embodiment and the fourth modification is a position of an edge. A specific description will be given. A curve AB that is the edge of the wedge edge portion D4 of the fourth modification is located inside a curve AB that is the edge of the wedge edge portion D1 of the above-described embodiment. Moreover, a curve AC that is an edge of the wedge edge portion D4 in the fourth modification is located inside a curve AC that is the edge of the wedge edge portion D1 of the above-described embodiment. Even in this modification, the change in the open area with respect to the opening angle of the valve plate 8 can be made moderate. However, due to the shape of the edge of the wedge edge portion D4, the open area at the beginning of opening is more moderate than that of the above-described embodiment.

Fifth Modification

Figure 16D:
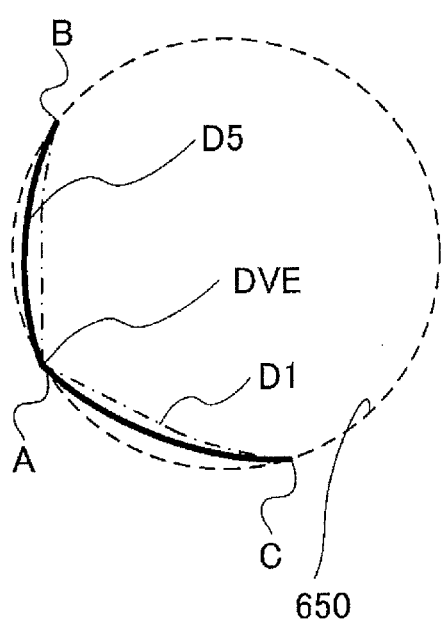

FIG. 16D is a view showing a fifth modification. For comparison, the wedge edge portion D1 of the above-described embodiment is indicated by dashed line. Moreover, for description, the same points A, B, C as those in FIG. 5 are shown. A vertex DVE of a wedge edge portion D5 of the fifth modification is located at the same position (the point A) as the position of the vertex DVE of the wedge edge portion D1 of the above-described embodiment. A difference between the above-described embodiment and the fifth modification is a position of an edge. A specific description will be given. A curve AB that is the edge of the wedge edge portion D5 in the fifth modification is located outside the curve AB that is the edge of the wedge edge portion D1 in the above-described embodiment. Moreover, a curve AC that is the edge of the wedge edge portion D5 in the fifth modification is located outside the curve AC that is the edge of the wedge edge portion D1 of the above-described embodiment. Even in this modification, as compared with the circular opening portion 650, the change in the open area with respect to the opening angle of the valve plate 8 can be made moderate. However, due to the shape of the edge of the wedge edge portion D5, the change in the open area at the beginning of opening is a little more rapid than that of the above-described embodiment. However, the open area changes more moderate than that of the circular opening portion 650.

Other Modifications

The following modifications are within the scope of the present invention. While in the above-described embodiment, the wedge edge portion D1 is provided only in an axial region in the vicinity of the valve plate 8 in an axial region of the opening portion 41, the wedge edge portion D1 may be provided in all the axial region of the opening portion 41.

The present invention can also be applied to a vacuum valve in which the sealing body 7 is not provided, and the valve plate 8 moves in a Z direction (the axial direction of the opening portions 31, 41) to bring about the valve closing state.

While in the above-described embodiment, the present invention is applied to the vacuum valve in which the slide plate oscillates (a pendulum-type vacuum valve), the present invention is not limited thereto. For example, the present invention can also be applied to a vacuum valve in which a slide plate linearly moves.

The present invention is not limited to the above-described contents. Other aspects that can be considered within the range of the technical idea of the present invention can also be included in the scope of the present invention.

What is claimed is:

1. A vacuum valve including a valve opening and a valve plate that opens and closes the valve opening, wherein
    a part of an edge of the valve opening is a wedge edge portion having a wedge shape projected outward, and
    the wedge edge portion is provided in a region where the valve plate starts to open the valve opening when the valve plate is moved to open the valve opening, and further wherein
    a vertex of a wedge of the wedge edge portion is located at a position where an edge of the valve plate first comes into contact with the edge of the valve opening,
    the wedge edge portion includes a first straight line segment extending from the vertex, a second straight line segment extending from the vertex, a first circular arc extending from the first straight line segment, and a second circular arc extending from the second straight line segment, and
    the edge of the valve opening further includes an arc of a circle connecting the first circular arc and the second circular arc.

2. The vacuum valve according to claim 1, wherein a member formed with the wedge edge portion is provided detachably with respect to the valve opening.

3. The vacuum valve according to claim 1, wherein when the valve plate starts to open the valve opening, a change rate of an opening area is made small, as compared with a valve opening having a circular cross section.

* * * * *